Figure 1:
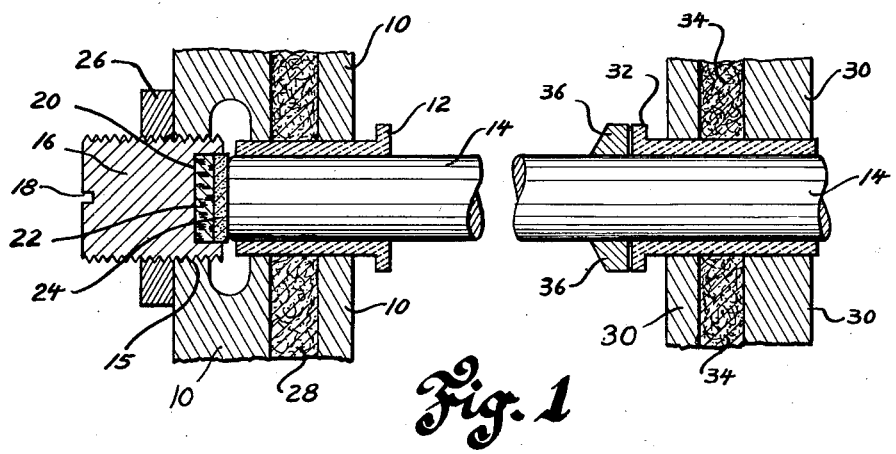

Aug. 14, 1951 W. P. KEISER 2,564,307
END PLAY DEVICE FOR DYNAMOELECTRIC MACHINE
Filed Sept. 3, 1946

INVENTOR:
WILLIAM P. KEISER
BY
Roy M. Eilers
ATTORNEYS.

Patented Aug. 14, 1951

2,564,307

UNITED STATES PATENT OFFICE 2,564,307

END PLAY DEVICE FOR DYNAMO-ELECTRIC MACHINE

William P. Keiser, St. Louis, Mo., assignor to Century Electric Company, a corporation of Missouri Application September 3, 1946, Serial No. 694,654

4 Claims. (Cl. 308—166)

This invention relates to improvements in dynamoelectric machines. More particularly, this invention relates to improvements in apparatus that is usable to prevent end play of the shafts of dynamoelectric machines.

It is, therefore, an object of the present invention to provide improved apparatus that is usable to prevent end play of the shafts of dynamoelectric machines.

In the operation of dynamoelectric machines, it is highly desirable to prevent end play of the shafts of those machines because such end play can result in noisy operation of the dynamoelectric machine, it can cause excessive wear of the bearings because of hammer-like blows which the shaft can administer to the bearing, and it can cause a shifting of the elements of the dynamoelectric machine relative to each other. In the past, various methods and apparatus have been devised to overcome and prevent end play in dynamoelectric machines, but those methods and apparatus were complicated, bulky and expensive and did not operate as efficiently as was desired. For example, dynamoelectric machines have been provided with a number of washers that were positioned between the ends of the sleeve bearings and shoulders on the shafts; and those washers were intended to bear against the shoulders on the shafts and to bear against the ends of the sleeve bearings and thus prevent axial movement of the shafts. In some instances, those washers were made of fiber or bronze to reduce the frictional engagement between themselves, between the ends of the sleeve bearings and themselves, and between the shoulders on the shafts and themselves. Where precisely the right amount of pressure is provided between the washers, shoulders and bearings, end play of the shafts can be prevented without excessive wear of the various elements of the device. However, it has been found to be exceedingly difficult to provide and maintain just the precise amount of pressure between the washers, shoulders and bearings of dynamoelectric machines because the elements of the devices used to prevent end play in dynamoelectric machines are solid and unyielding and must be given exceptionally precise tolerances. Such tolerances have been found to be attained only infrequently; and in most instances, the elements of the end-play-preventing device have been assembled with too great a pressure on the various elements. As a result, in many instances, frictional losses were found to be excessive, and the consequent wearing of the washers against each other and against the shoulders on the shafts and the ends of the sleeve bearings was found to lead to end play of the shafts.

In an effort to reduce the wear of the various elements of the end-play-preventing devices, elaborate oiling systems were sometimes used to reduce the wear; and in still other instances, discs of bearing metal were set in position against the ends of the shafts and were held there by adjustable screws or bolts. However, the oiling systems and the adjustable screws and bolts could not overcome the basic defect of having solid, unyielding elements bearing against each other under an unyielding pressure or force. With continued usage, the wear and friction will themselves change the tolerances, and may even cause a slight rotation of the screws or bolts that would materially affect the tolerances. Thus even where presently known end-play-preventing devices for dynamoelectric machines are given a satisfactory initial setting and are provided with a lubrication system, those devices cannot maintain that initial setting for long and will begin to permit end play of the shafts of the dynamoelectric machines. As a result, the setting of these end-play-preventing devices for dynamoelectric machines has to be changed periodically or end play of the shafts of those machines has to be tolerated. The need of periodic adjustment of the screws or bolts detracts from the value of the dynamoelectric machines since it requires a skilled maintenance man; and even a skilled maintenance man may set the screws or bolts so they will cause the shafts to bind. For these various reasons the presently known methods and apparatus for preventing end play in dynamoelectric machines are objectionable. The present invention obviates these objections by providing improved methods and apparatus for eliminating end play of the shafts of dynamoelectric machines; and in particular, the present invention uses a resilient, oil-resistant disc to hold an oil-impregnated porous metal plate against the end of the shaft with just the right amount of pressure. It is, therefore, an object of the present invention to provide an improved method and apparatus that eliminates the end play of the shaft of a dynamoelectric machine by using a resilient, oil-resistant disc to hold an oil-impregnated metal plate against the end of the shaft.

It has been found necessary in apparatus that controls the end play of the shaft of a dynamoelectric machine to provide a precise and exact adjustment of the member that bears against the shaft of the machine. It is desirable that the elements used to provide this adjustment be simple and inexpensive and still provide precise, accurate, simply made, and long-lived adjustments. The present invention provides such apparatus; and that apparatus includes an internally threaded opening in the housing of the dynamoelectric machine, an externally threaded plug which carries a resilient, oil-resistant disc and an oil-impregnated porous metal disc and which can be threaded into the internally threaded opening of the dynamoelectric machine housing, and a lock nut that holds the plug securely in position once the porous metal disc has been urged against the end of the shaft. It is, therefore, an object of the present invention to provide a dynamoelectric machine wherein an externally threaded plug can be set and locked in precise position relative to the internally threaded housing of the dynamoelectric machine, and wherein that plug and the resilient, oil-resistant disc carried thereby can hold an oil-impregnated metal disc in contact with the end of the shaft of the dynamoelectric machine.

Other objects and advantages of the present invention should become apparent from an examination of the drawing and accompanying description.

In the drawing and accompanying description, a preferred embodiment of the invention is shown and described but it is to be understood that the drawing and accompanying description are for the purposes of illustration only and do not limit the invention and that the invention will be defined by the appended claims.

Figure 2:
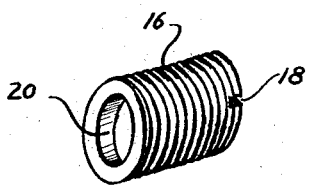
Figure 3:
Figure 4:
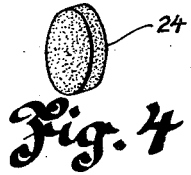

In the drawing, Fig. 1 is a partially sectioned side elevational view of the opposite ends of the shaft of a dynamoelectric machine and the bearings therefor; and it shows the improved apparatus provided by the present invention to eliminate end play of the shafts of dynamoelectric machines, Fig. 2 is a perspective view of the externally threaded plug of Fig. 1, Fig. 3 is a perspective view of the resilient, oil-resistant disc of Fig. 1, and Fig. 4 is a perspective view of the oil-impregnated metal disc of Fig. 1.

Referring to the drawing in detail, the numeral 10 denotes a portion of the end bell or end section at the left hand end of the housing of a dynamoelectric machine, 12 is a sleeve bearing fixedly held by the end bell or end section 10, and 14 is the rotatable shaft of the dynamoelectric machine. Formed in the end bell or end section 10 of the dynamoelectric machine is an internally threaded opening 15 that receives an externally threaded plug 16. The opening 15 and the plug 16 are provided with threads of very small pitch; and these threads provide a "micrometer" movement of the plug 16 relative to the end bell or end section 10, thus facilitating precise adjustment of the externally threaded plug 16 relative to the left hand end of the shaft 14. The externally threaded plug 16 has a transversely extending, generally rectangular slot 18 across the outer end thereof, and this slot is intended to receive the blades of screwdrivers or other tools and thus permit selective and precise rotation of plug 16 relative to the end bell or end section 10. A generally circular recess 20 is provided in the inner end of the externally threaded plug 16, and the recess 20 is dimensioned to receive and hold a disc 22 and a disc 24. The disc 22 is made of resilient, oil-resistant material. One such material is cork and another is one of the oil-resistant synthetic rubber compounds. Cork is a particularly desirable material since it is porous in addition to being resilient and oil-resistant. As a result, where the disc 22 is made of cork it can act to hold oil in contact with the disc 24. The disc 24 is itself made of porous metal which has previously been impregnated with oil; and it is made of metal that has good bearing qualities. One such metal is bronze, and that metal has been used and has given excellent results.

The discs 22 and 24 are dimensioned so that when they are inserted in the recess 20 of the threaded plug 16, as shown in Fig. 1, one face of the porous metal disc 24 will project a short distance beyond the inner end of the plug 16. The disc 24 is also preferably dimensioned so its diameter is very nearly the same as the diameter of the recess 20 of externally threaded plug 16 and so the engagement between the inner periphery of recess 20 and the outer periphery of disc 24 can act to hold disc 22 and disc 24 in assembled relation with the plug 16.

Threaded to engage the outside of the externally threaded plug 16 is an internally threaded lock nut 26. The lock nut 26 has one surface thereof that can engage and bear against the outer surface of the end bell or end section 10 to lock the threaded plug 16 in position relative to the end bell or end section 10. The end bell or end section 10 is provided with an oil reservoir 28 that in turn is provided with a suitable filling and level-maintaining device, not shown. Moreover the reservoir 28 is preferably filled with oil-absorbent material such as wool. This oil-absorbent material will absorb oil introduced into the reservoir 28 and will conduct the oil to the sleeve bearing 12 by capillary action. In the drawing the sleeve bearing 12 is shown as being made of porous, oil-impregnated metal; and with such a bearing the oil will be transferred from the oil-absorbent material in the reservoir 28 to the porous metal of the sleeve bearing 12; and the porous metal of bearing 12 will maintain a thin film of oil on the surface of the shaft 14. If desired, the sleeve bearing 12 can be made of solid metal and can be provided with an opening in the side thereof through which the oil-absorbent material in the reservoir can extend to contact the shaft. With this construction, as with the porous metal sleeve bearing construction, a thin film of oil is provided on the surface of the shaft 14; and this oil film will cooperate with the oil in the oil-impregnated disc 24 to provide adequate lubrication of the left hand end of shaft 14. The initial impregnation of the metal plate 24 with oil will enable that plate to provide an oil film on the end of the shaft that will last for almost indefinite periods of time; and with the construction shown in the drawing, that initial amount of oil can never become exhausted because the oil films at the end and side of the shaft will merge and the reservoir 28 can act through the sleeve bearing 12 to provide an ever-present supply of oil for the side and end of the shaft 14. Thus, if any of the oil in plate 24 is consumed it will automatically be replenished from the oil in the porous metal sleeve bearing 12. In this way, adequate lubrication of the left hand end of the shaft 14 is assured.

Adequate lubrication of the right hand end of the shaft is also assured by a sleeve bearing in communication with an oil reservoir. The numeral 30 denotes the right hand end bell or end section of the dynamoelectric machine, 32 is the sleeve bearing of porous material, and 34 is the oil reservoir that is preferably filled with oil-absorbent material. As in the case of sleeve bearing 12, the oil-absorbent material will conduct oil to the outer periphery of the bearing 32 by capillary action; and the oil will be transferred to the bearing 32 and automatically supplied to the shaft 14 as it is needed. Also, as in the case of sleeve bearing 12, sleeve bearing 32 can be made of solid metal and can be provided with a side opening through which oil-absorbent material can extend to contact the shaft 14.

Immediately adjacent the left hand end of the sleeve bearing 32 is a shoulder 36 on the shaft 14. This shoulder has a smoothly polished face that bears against the left hand end of the bearing 32, thus limiting shifting of the shaft 14 to the right. There will be only negligible frictional loss between shoulder 36 and the bearing 32 since the sleeve 32 is impregnated with oil and since the oil film on the shaft 14 will extend to and will cover the polished face of shoulder 36.

In the operation of the apparatus of the present invention, the resilient, oil-resistant disc 22 is initially inserted in the recess 20 of the externally threaded plug 16, and thereafter the oil-impregnated porous metal disc 24 is inserted into the recess 20. Assuming that the stator and rotor have already been installed in the dynamoelectric machine and that the end bell or end section 10 is in place, the externally threaded plug 16 is then threaded into the internally threaded opening 15 of end bell or end section 10 as shown in Fig. 1. In that position the oil-impregnated porous metal disc 24 will bear against the smoothly-polished left hand end of the shaft 14, the shoulder 36 will bear against the left hand end of bearing 32, and the resilient, oil-resistant disc 22 will provide just the right amount of pressure to hold the shaft against end play. Thereafter, while the threaded plug 16 is held in the desired position by means of a screwdriver inserted into the slot 18, the internally threaded lock nut 26 will be rotated into engagement with the threads of plug 16 and will be threaded tightly against the end bell or end section 10 of the dynamoelectric machine. When this has been done, and this recitation of the steps required to assemble the device is an indication of how easily and simply this can be done, the dynamoelectric machine is ready for sale and shipment.

In setting the externally threaded plug, considerable latitude is possible because of the resilient disc 22. If the plug 16 is set in the exact position, there will, of course, be very little wearing of the parts; but even if the plug 16 is set to one side or the other of the desired position there will still be very little wearing of the parts although end play will be prevented. This is largely due to the resilient disc 22 which will be compressed a certain amount when the plug 16 is in the exact position, and can still operate effectively when compressed to a lesser or greater degree. Thus it is possible to obtain prevention of end play and reduced wearing of the elements of the device without the necessity of having exact and precise adjustment of the device.

In use in the field, the oil-impregnated disc 24 will be held against the left end of the shaft 14 and the shoulder 36 will bear against the end of the sleeve bearing 32; and the two will cooperate to prevent shifting of the shaft 14 to right or left. In addition, the disc 24 and bearing 12 will provide adequate lubrication for the left end of shaft 14 while bearing 32 will provide adequate lubrication of the right hand end of shaft 14 and the shoulder 36 carried thereby; and in this way appreciable wear of the shaft 14 will be prevented. The resilient, oil-resistant disc 22 will have a high resistance to fatigue and will have a high resistance to the action of the oil in the disc 24; and thus the pressure between the disc 24 and the left hand end of the shaft 14 and the pressure between shoulder 36 and bearing 32 will remain relatively constant over the life of the device. In addition, any wearing of the left hand end of the shaft 14 or the face of disc 24, or any wearing of shoulder 36 or bearing 32 will be compensated for by a slight and gradual movement of the disc 24 outwardly from the recess 20 under the action of the resilient disc 22. If, after years of continuous operation, the disc 24 requires some additional adjustment that cannot be automatically given by the action of the disc 22, it is only necessary to loosen lock nut 26 momentarily, to adjust the position of plug 16 with a screwdriver, and then to tighten the lock nut 26.

With this invention, the number of elements required in apparatus used to eliminate the end play of the shafts of dynamoelectric machines is held to a minimum. In addition, the number of steps required to assemble and adjust the device are held to a minimum. Moreover, the present invention positively avoids binding of the shaft by reason of improper adjustment of the apparatus since the resilient disc 22 can yield and absorb an overadjustment of the externally threaded plug 16. In addition it should be noted that the device of the present invention is compact, self-contained and requires a minimum of elements and space. From this it is apparent that the apparatus provided by the present invention is simple, inexpensive, certain of action, and long-lived.

Whereas a preferred embodiment of the invention has been shown and described in the drawing and accompanying description, it is to be understood that various changes may be made in the form of the invention without affecting the scope thereof.

What I claim is:

1. In a dynamoelectric machine, a housing for said dynamoelectric machine, an internally threaded opening at one end of said housing for said dynamoelectric machine, an externally threaded plug that is threadable into said internally threaded opening, a recess in one end of said threaded plug, a resilient cork disc that has a configuration complementary to the configuration of said recess whereby said resilient cork disc is insertable into said recess, and an oil-impregnated porous metal disc that has a configuration complementary to the configuration of said recess whereby said oil-impregnated porous metal disc is insertable at least partially into said recess, said resilient cork disc and said oil-impregnated porous metal disc being dimensioned relative to the depth of said recess in said externally threaded plug so one face of said oil-impregnated porous metal disc can project outwardly from and extend beyond the recessed end of said threaded plug, and an internally threaded lock washer that is threadable onto the externally threaded plug to prevent rotation of said plug relative to the internally threaded opening at said one end of said housing.

2. In a dynamoelectric machine a housing for said dynamoelectric machine, an internally threaded opening at one end of the housing for said dynamoelectric machine, an externally threaded plug that is threadable into said internally threaded opening, a recess in one end of said threaded plug, a resilient disc of oil-resistant material that has a configuration complementary to the configuration of said recess whereby said resilient disc of oil-resistant material is insertable into said recess, and an oil-impregnated porous metal disc that has a configuration complementary to the configuration of said recess whereby said oil-impregnated porous metal disc is insertable at least partially into said recess, said disc of oil-resistant material and said oil-impregnated porous metal disc being dimensioned relative to the depth of said recess in said externally threaded plug so one face of said oil-impregnated porous metal disc can project outwardly from and extend beyond the recessed end of said threaded plug, and an internally threaded lock washer that is threadable onto the externally threaded plug to prevent rotation of said plug relative to the internally threaded opening at said one end of said housing.

3. In a dynamoelectric machine, a sleeve bearing, an oil reservoir that is adjacent to said bearing and is arranged to provide a thin film of oil on the shaft rotatably supported by said bearing, said shaft having one end thereof smoothly polished, a smooth-faced oil-impregnated disc having one face thereof in contact with the smoothly-polished end face of said shaft, a resilient cork disc having one face thereof in contact with the other face of said smooth-faced oil-impregnated disc, and adjustably mounted means bearing against the other face of said resilient cork disc, said sleeve bearing being adjacent to the smoothly-polished end face of said shaft and to the smooth-faced oil-impregnated disc bearing against said end face of the shaft whereby oil from said sleeve bearing can spread along the shaft and lubricate said smooth-faced oil impregnated disc and said smoothly-polished end face of said shaft.

4. In a dynamoelectric machine, a sleeve bearing, an oil reservoir that is adjacent to said bearing, and is arranged to provide a thin film of oil for the shaft rotatably supported by said bearing, said shaft having a smooth face at one end thereof, a smooth-faced oil-impregnated disc having one face thereof in contact with the said smooth end face of said shaft, a resilient cork disc having one face thereof in contact with the other face of said smooth-faced oil-impregnated disc, and an adjustably mounted recessed plug supporting and bearing against the other face of said resilient cork disc, said sleeve bearing being adjacent to the said smooth end face of said shaft and to the smooth-faced oil-impregnated disc bearing against said smooth end face of the shaft whereby oil from said sleeve bearing can spread along the shaft and lubricate said smooth-faced oil-impregnated disc and said smooth end face of said shaft.

WILLIAM P. KEISER.

REFERENCES CITED

The following references are of record in the file of this patent:

UNITED STATES PATENTS

| Number | Name | Date |
| --- | --- | --- |
| 504,049 | Phillips | Aug. 29, 1893 |
| 1,462,716 | Masin | July 24, 1923 |
| 1,534,762 | Bostick | Apr. 21, 1925 |
| 1,618,877 | Henry | Feb. 22, 1927 |
| 1,987,178 | Brown | Jan. 8, 1935 |

FOREIGN PATENTS

| Number | Country | Date |
| --- | --- | --- |
| 14,738 | Sweden | Nov. 2, 1900 |